Sept. 19, 1939.   J. B. JARMIN ET AL   2,173,277
TRAILER
Filed Dec. 20, 1937   2 Sheets-Sheet 2

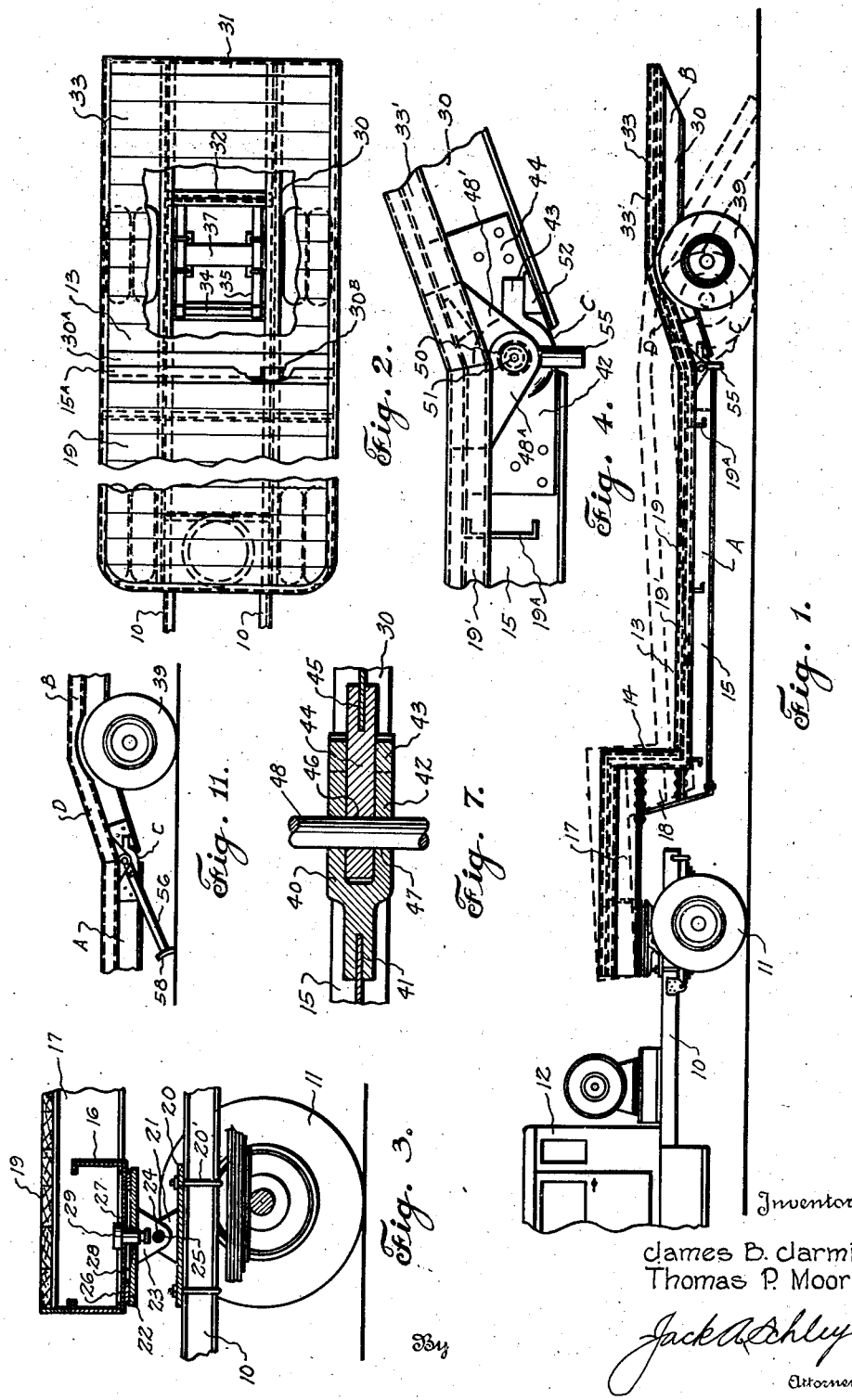

Inventors
James B. Jarmin
Thomas P. Moore

By Jack A. Schley
Attorney

Patented Sept. 19, 1939

2,173,277

UNITED STATES PATENT OFFICE 2,173,277

TRAILER

James B. Jarmin and Thomas P. Moore, Dallas, Tex.

Application December 20, 1937, Serial No. 180,781

14 Claims. (Cl. 214—85)

This invention relates to new and useful improvements in trailers.

One object of the invention is to provide an improved trailer which is particularly adapted for use with motor vehicles or trucks, and which is so constructed that heavy loads may be readily loaded upon and hauled on said trailer.

An important object of the invention is to provide an improved trailer having its rear portion hinged to the body of the trailer, so that when the hinged joint is broken to swing said rear portion downwardly into engagement with the ground, said rear portion forms an inclined ramp which permits heavy machinery or other equipment to be easily loaded or unloaded in a minimum time and with a minimum amount of labor.

A particular object of the invention is to provide an improved trailer constructed of a pair of hinged sections and being so arranged that the main bed or platform of the trailer is offset whereby said bed is lower or disposed closer to the ground than the usual trailer, which permits large and heavy equipment to be more readily transported on said trailer.

Another object of the invention is to provide an improved trailer having its forward end pivotally secured to the bed of a motor vehicle with its rear portion supported upon wheels and being constructed of two sections hinged together; the hinged joint being so located that when the joint is broken the front section is swung around the pivotal connection at its forward end and the rear section is swung around the rear wheels, which act as a fulcrum.

A further object of the invention is to provide an improved trailer of the character described, wherein the motive power of the truck or vehicle to which the trailer is attached may be utilized to swing the sections of the trailer into raised or loading position.

A construction designed to carry out the invention will be hereinafter described, together with other features of the invention.

Figure 5:
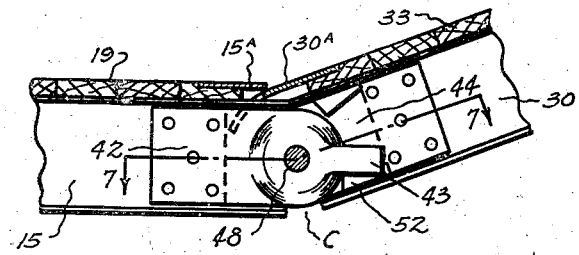
Figure 8:
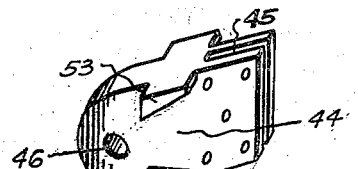
Figure 9:
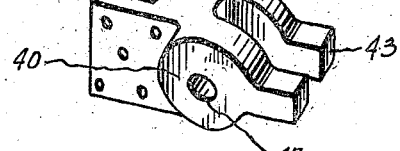
Figure 6:
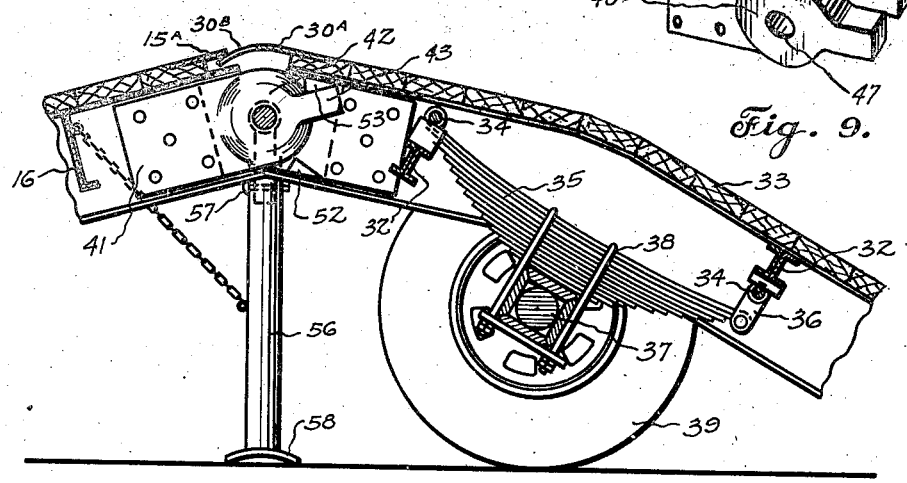
Figure 10:
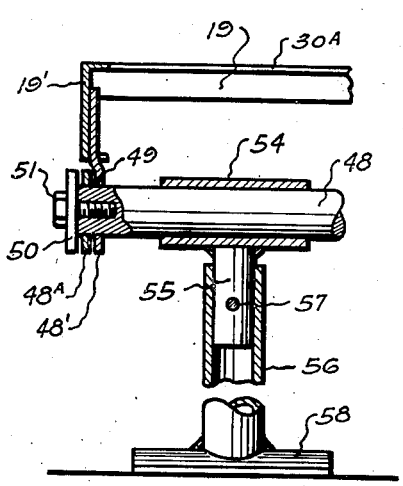
Figure 12:
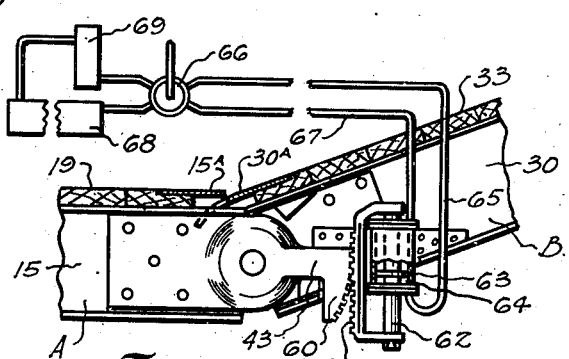

The invention will be more readily understood from a reading of the following specification and by reference to the accompanying drawings, in which an example of the invention is shown, and wherein:

Figure 1 is a side elevation of a trailer, constructed in accordance with the invention, Figure 2 is a partial plan view thereof, having a portion broken away to illustrate the rear wheel mounting, Figure 3 is an enlarged vertical, sectional view of the connection between the trailer and truck bed, Figure 4 is an enlarged side elevation of the hinge between the trailer sections, showing the same in a normal position, Figure 5 is a vertical, sectional view taken through the truck bed adjacent the hinged members, with the rear section in a normal position, Figure 6 is a longitudinal, sectional view showing the hinge joint broken and also showing the mounting of the rear axle on the rear section of the trailer, Figure 7 is a horizontal, cross-sectional view taken on the line 7—7 of Figure 5, Figure 8 is an isometric view of one of the hinge members, Figure 9 is an isometric view of the complementary hinge member, Figure 10 is an enlarged partial transverse, vertical, sectional view and showing one end of the connecting shaft for the hinged elements, Figure 11 is a partial side elevation of the hinge between the trailer sections and showing the lifting leg secured in position and prior to the breaking of the hinge joint, and Figure 12 is an enlarged sectional view, similar to Figure 5 and showing a hydraulic means for swinging the sections.

In the drawings, the numeral 10 designates the frame bars of a motor truck, or other vehicle which may be of any desired construction. The truck is provided with the rear supporting and drive wheels 11 and a cab 12 is located forwardly on the bars in the usual manner. The front of the truck, as well as the front wheels, has been omitted. It is pointed out that the truck or vehicle forms no part of the present invention and therefore, its construction is subject to variation.

An elongate trailer 13 has its forward end secured to the rear of the truck frame bars 10 and this trailer includes a front section A and a rear section B, which sections are pivotally secured to each other by a hinge C. The front section is, preferably, of a greater length than the rear section and is provided with an offset 14 at its forward portion. The section A may be of any desired construction, but it is preferable to construct the same of elongate I-beams 15 which extend in parallel spaced relation to each other. The beams are secured together and braced by transverse channels bars 16. The offset 14 is formed by locating short I-beams 17 in a horizontal plane above the I-beams 15 and securing the rear portion of said beams 17 to the front portion of the beams 15 by means of vertical channel members 18. A suitable platform or bed 19 of wood, or other material, is supported on the frame thus formed and channel bars 19' are fastened to the edges of the bed 19 and depend therefrom. These channels are suitably braced by channel members 19a which extend from the outer sides of the beams 15 beneath the members, being welded in position.

The forward ends of the beams 17, which form the front portion of the section A are adapted to overlie the rear of the truck frame bars 10. A transverse base plate 20 (Figure 3) is secured to the bars 10 by U-bolts 20' and upstanding ears 21 are provided on the plate. A supporting plate 22 has depending lugs 23 which extend contiguous to the ears 21 and a transverse bolt or rod 24 passes through registering openings 25 in the ears and lugs, whereby the supporting plate 22 is pivotally mounted on the base plate and truck frame to which the latter plate is secured. The forward ends of the I-beams 17 are fastened to each other by a transverse connecting member 26 which is secured to their undersides and this member overlies the supporting plate 22. The member has an opening 27 therein while the plate 22 provided with a registering opening 28, whereby a connecting pin 29 may be inserted therein to connect the forward end of the section A to the supporting plate. The pin has an annular groove in its lower end for receiving a U-clamp or yoke (not shown) to prevent displacement of said pin. Obviously, with the above arrangement the forward end of the section A is pivotally secured to the rear end of the truck frame 10. Due to the offset 14, the main portion of the section A, which receives the machinery or other equipment being handled, is lower than the frame of the truck and is relatively close to the ground. This permits large and heavy machinery to be carried on the trailer with no danger of such large equipment extending upwardly too high for clearance beneath underpasses and the like.

The rear section B of the trailer may be constructed in any suitable manner but is preferably made similar to the front section. The rear section, as has been stated, is shorter in length than the front section and includes a pair of parallel I-beams 30 which are spaced the same distance apart as are the beams 15 of the section A, whereby when the sections are hinged together, the beams 30 are longitudinally alined with the beams 15. The beams 30 are bent whereby the front portion of the section B inclines downwardly at D toward the rear end of the section A, while the rear portion of the section B extends horizontally, substantially parallel to the bed 19 of the section A, as clearly shown in Figure 1.

The beams 30 are connected at their rear ends by a channel bar 31 and at their central portions by transverse flanged braces 32. A platform or bed 33 is supported on the frame so formed and channel bars 33' depend from the edges of said bed. A pair of transverse supporting shafts 34 extend between the beams 30, being located adjacent the braces 32. Leaf springs 35, of the usual construction, have their forward ends fastened to one of the shafts, while their rear ends are supported in shackles 36 which are secured to the other shaft. An axle 37 is fastened to the springs 35 by U-bolts 38 and the trailer supporting wheels 39 are journaled on the ends of the axle. The axle is preferably supported beneath the forward end of the flat portion of the section B and behind the inclined portion D when the trailer is in hauling position, as shown in Figure 1. The particular mounting of the wheels 39, axle 38 and springs 35 form no part of the invention and are therefore subject to variation.

The sections A and B are connected by a hinged joint C whereby said sections may be swung with relation to each other. The hinge is located nearer the rear wheels 39 and normally the parts are in the position shown in Figure 1. When the hinged joint is broken upwardly, both sections are swung, the rear end of the section A and the front end of the section B moving upwardly. The section A swings on the bolt or rod 24 located on the truck frame while the rear section B swings around the rear axle which acts as a fulcrum. Due to the inclined portion D of the rear section B, the upward swinging of the forward end of said section causes the rear end of the section to swing downwardly into engagement with the ground (dotted lines, Figure 1) whereby an inclined ramp or runway is provided. For covering the space which is formed between the sections when the same are swung, the rear section has a transversely extending curved plate 30a secured to its bed 33 and this plate is movable beneath a complementary overhanging plate 15a projecting rearwardly from the bed 19 of the front section. The plate 30a is notched at 30b, whereby when the sections are in a normal position with the upper ends of the beams 15 and 30 abutting, the plate may slide beneath the bed 19 with the notches receiving the beams 15. The machinery or equipment can be quickly and easily moved up the ramp formed by the section B, over the rear wheels 39, and onto the main trailer bed 19 of the front section. After the equipment is loaded, the joint is returned to its normal position permitting the trailer sections to assume their normal hauling positions. Unloading of the equipment is just as easily accomplished by again breaking the joint upwardly and again swinging the sections so that the rear section B provides a ramp.

Various types of hinges may be employed for connecting the sections A and B but it is preferable that the hinge be constructed as shown in Figures 5 to 8. The hinge C includes a pair of yoke-shaped brackets 40, each of which has side plates 41 spaced from each other. One of the brackets is secured to each I-beam 15 at the rear end thereof and the rear end of the web of each beam is cut away or shortened, whereby the side plates 41 of the bracket may be confined between the flanges of the beam. The web is received between the side plates 41 and said plates are riveted or otherwise secured thereto.

Extending outwardly from the side plates 41 of each bracket are yoke arms 42 which have their outer ends rounded and then reduced to form projecting lugs 43. One of these brackets is secured to the rear end of each beam 15 and, as is clearly shown in Figure 5, the yoke arms 42 extend beyond the end of the beam.

The beams 30 of the rear sections are longitudinally alined with the beams 15 and the forward ends of said beams have connecting plates 44 fastened thereto. Each connecting plate is provided with a groove 45 and the forward end of the web of each beam 30 is cut away in a manner similar to the webs of the beams 15. The web of each beam 30 is received within the groove 45 of the connecting plate 44 and the plate is thus confined between the flanges of the beam. Rivets, or other fastening means, pass through the plate and web to securely fasten said plate thereto.

The outer end of each plate 44 projects beyond the end of the beam 30 and extends between the yoke arms 42 of the bracket 40 on one of the beams 15 of the section A. The projecting end of each connecting plate is formed with an opening 46, while the contiguous yoke arms 42 of the bracket are provided with openings 47 which register with said opening. A transverse shaft 48 extends through the openings 46 and 47 of both plates and brackets and pivotally connects these parts. The shaft extends throughout the width of the trailer bed and has its ends supported in ears 48a and 48' which depend from the channel bars 19' and 33' of the sections A and B respectively. As is clearly shown in Figures 4 and 10, each ear 48a is secured to the inner side of the rear of the channel bar 19' while each ear 48' is fastened to the forward portion of the channel bar 33' and said ears lie contiguous to each other. The ears are provided with registering openings 49 through which the ends of the shaft extend. An end washer or disk 50 which is larger in diameter than the shaft and openings 49 is secured to each end of the shaft by a bolt 51 and the disks prevent lateral displacement of the shaft.

From the foregoing, it is obvious that the sections A and B are hinged together by the brackets 40 and the connecting plates 44 which are pivoted together by the transverse shaft 48. The yoke arms 42 of each bracket lie contiguous to and move over the surfaces of the connecting plates when the sections are swung. The projecting lugs 43 on said yoke arms also swing over said plates and in order to limit the swinging movement of the sections, outwardly projecting stop lugs 52 and 53 are provided on each side of each plate 44. These lugs are located adjacent the flanges of the beam and are disposed in the path of the lugs 43 of the brackets. Manifestly, the stop lugs coact with the lugs 43 to limit the swinging movement of the sections with relation to each other. When the sections of the trailer are in a normal hauling position, the lugs 43 of the brackets are engaging the lower stops 52 and when in a loading position (Figure 6) the lugs 43 are in contact with the upper lugs. Thus, a positive limit on the swinging sections is provided.

For quickly and easily breaking the hinged joint so as to swing the sections A and B to a loading position, a sleeve 54 is rotatably confined on each end portion of the shaft 48 (Figure 10) between each bracket 40 and the ears 48a and 48'. This sleeve has a depending pin or shank 55. When it is desired to swing the sections to the position shown in dotted lines in Figure 1, a tubular leg 56 is engaged over each shank and is fastened thereto by a transverse pin 57 which passes through registering openings in the leg and shank. Each leg has a base plate 58 at its lower end and after being secured to the shanks, the legs are placed in the position shown in Figure 11. The truck and trailer are then moved forwardly and the base plates of the legs are embedded in the ground. The legs are of a greater length than the distance between the ground and hinges C and therefore, continued forward movement of the truck and trailer causes the shaft 48 to move upwardly, thereby swinging the sections to the position shown in dotted lines in Figure 1, whereby the rear section is swung to form an inclined ramp. To remove the legs and lower the sections it is only necessary to back the truck and trailer causing the legs to swing from beneath the hinges C, after which they may be removed from the pins or shank 55.

Various means, other than the legs 56, may be employed to swing the sections and in Figure 12, a hydraulic swinging means is shown. In this form, the outer lug 43 of each bracket 40 is provided with an arcuate gear segment 60. This gear segment is in constant mesh with a gear rack 61 which is secured to the rod 62 of a piston 63. The piston reciprocates within a hydraulic cylinder 64 and as said piston moves, movement is imparted to the rack which swings the segment and bracket 40 of the section A. Swinging of the section A causes swinging of the section B to break the hinge joint, as has been described. For operating the piston a fluid line 65 extends from one side of the cylinder to a two-way valve 66 and a similar line 67 connects the opposite end of the cylinder to the valve. The valve is connected by suitable lines to a fluid reservoir 68 and pump 69 and by manipulating the valve 66, the fluid may be directed in a desired direction through the system to move the piston in either direction to raise or lower the trailer sections.

What I claim and desire to secure by Letters Patent is:

1. A trailer adapted to be attached to a motor vehicle including, an elongate front section arranged to have its forward end pivotally connected with the motor vehicle, a rear section hinged to the rear end of the front section, and ground wheels supporting the rear section and acting as a fulcrum point about which said rear section may swing, the hinge permitting the sections to be swung upwardly at the hinge which causes the rear end of the rear section to engage the ground to form an inclined ramp for loading and unloading purposes.

2. A trailer adapted to be attached to a motor vehicle including, an elongate front section having its forward end secured to the vehicle, said section having an offset therein whereby the main portion of the section is lowered with relation to the ground, a rear section hinged to said front section, and ground wheels supporting said rear section and having said section pivotally mounted thereon.

3. A trailer adapted to be attached to a motor vehicle including, an elongate front section having its forward end secured to the vehicle, said section having an offset therein whereby the main portion of the section is lowered with relation to the ground, a rear section having its forward portion inclined downwardly and pivotally attached to the rear of the front section, and ground wheels for pivotally supporting the rear section, the pivotal connection between the sections permitting upward swinging of the sections at said connection and the inclination of the forward portion of the rear section causing said rear section to engage the ground when the sections are swung, whereby an inclined runway is formed.

4. A trailer including, a front section adapted to have its forward end secured to a motor vehicle, a rear section supported to swing on the transverse axle of the ground wheels, hinge elements secured to the rear of the front section, and complementary hinge elements on the front of the rear section and pivotally secured thereto, whereby a hinged joint connects the sections, such joint permitting the sections to be swung so as to engage the rear end of the rear section with the ground to form an inclined ramp for loading and unloading purposes.

5. A trailer adapted to be attached to a motor vehicle including, an elongate front section arranged to have its forward end pivotally connected with the motor vehicle, a relatively short rear section hinged to the rear end of the front section, ground wheels swingably supporting the rear section, the hinge permitting the sections to be swung upwardly at the hinge which causes the rear end of the rear section to engage the ground to form an inclined ramp for loading and unloading purposes, and means for limiting the swinging movement of said sections.

6. A trailer adapted to be attached to a motor vehicle including, an elongate front section having its forward end secured to the vehicle, said section having an offset therein whereby the main portion of the section is lowered with relation to the ground, a rear section having its forward portion inclined downwardly and pivotally attached to the rear of the front section, ground wheels for supporting the rear section, the pivotal connection between the sections permitting upward swinging of the sections at said connection and the inclination of the forward portion of the rear section causing said rear section to engage the ground when the sections are swung, whereby an inclined runway is formed, and means for limiting the swinging movement of said sections.

7. A trailer including, a front section adapted to have its forward end secured to a motor vehicle, a rear section swingably supported on the transverse axle of the ground wheels, hinge elements secured to the rear of the front section, complementary hinge elements on the front of the rear section and pivotally secured thereto, whereby a hinged joint connects the sections, such joint permitting the sections to be swung so as to engage the rear end of the rear section with the ground to form an inclined ramp for loading and unloading purposes, a stop member secured to the front section and adapted to swing therewith, and stop lugs secured to the rear section and located in the path of the member for limiting the swinging movement of the sections.

8. A trailer adapted to be attached to a motor vehicle including, an elongate front section having its forward end secured to the vehicle, said section having an offset therein whereby the main portion of the section is lowered with relation to the ground, a rear section hinged to said front section, ground wheels swingably supporting said rear section, a stop member secured to the front section and adapted to swing therewith, stop lugs secured to the rear section and located in the path of the member for limiting the swinging movement of the sections.

9. A trailer adapted to be attached to a motor vehicle including, an elongate front section arranged to have its forward end pivotally connected with the motor vehicle, a rear section hinged to the rear end of the front section, ground wheels supporting the rear section, the hinge permitting the sections to be swung upwardly at the hinge which causes the rear end of the rear section to engage the ground to form an inclined ramp for loading and unloading purposes, a depending pin at the hinge between the sections, and an elongate lifting leg adapted to be connected to the pin, whereby said leg engages the ground at an inclination and upon forward movement of the trailer raises the hinge upwardly to swing the sections.

10. A trailer adapted to be attached to a motor vehicle including, an elongate front section arranged to have its forward end pivotally connected with the motor vehicle, a rear section hinged to the rear end of the front section, ground wheels supporting the rear section, the hinge permitting the sections to be swung upwardly at the hinge which causes the rear end of the rear section to engage the ground to form an inclined ramp for loading and unloading purposes, means for limiting the swinging movement of said sections, a depending pin at the hinge between the sections, and an elongate lifting leg adapted to be connected to the pin, whereby said leg engages the ground at an inclination and upon forward movement of the trailer raises the hinge upwardly to swing the sections.

11. A trailer including, a front section adapted to have its forward end secured to a motor vehicle, a rear section supported on ground wheels, hinge elements secured to the rear of the front section, complementary hinge elements on the front of the rear section, a transverse shaft extending through the hinge elements to pivotally connect the sections, depending pins rotatably mounted on the shaft, and elongate lifting legs arranged to be connected with the pins, whereby the legs incline and have their lower ends engaging the ground so that upon forward movement of the trailer, said legs raise the shaft to swing the sections.

12. A trailer including, a front section adapted to have its forward end secured to a motor vehicle, a rear section supported on ground wheels, hinge elements secured to the rear of the front section, complementary hinge elements on the front of the rear section, a transverse shaft extending through the hinge elements to pivotally connect the sections, depending pins rotatably mounted on the shaft, elongate lifting legs arranged to be connected with the pins, whereby the legs incline and have their lower ends engaging the ground so that upon forward movement of the trailer, said legs raise the shaft to swing the sections, a stop member secured to the front section and adapted to swing therewith, and stop lugs secured to the rear section and located in the path of the member for limiting the swinging movement of the sections.

13. A trailer adapted to be attached to a motor vehicle including, an elongate front section arranged to have its forward end pivotally connected with the motor vehicle, a relatively short rear section hinged to the rear end of the front section, ground wheels swingably supporting the rear section, the hinge being disposed nearer the ground wheels and permitting the sections to be swung upwardly at the hinge which causes the rear end of the rear section to engage the ground to form an inclined ramp for loading and unloading purposes, and hydraulic means for breaking the hinge joint and swinging the sections.

14. A trailer including, a front section adapted to have its forward end secured to a motor vehicle, a rear section supported on ground wheels, hinge element secured to the rear of the front section, complementary hinge elements on the front of the rear section and pivotally secured thereto, whereby a hinged joint connects the sections, such joint permitting the sections to be swung so as to engage the rear end of the rear section with the ground to form an inclined ramp for loading and unloading purposes, each hinge element on the front section having a gear segment thereon, a gear rack in engagement with each segment, a hydraulic piston fastened to each gear rack for moving the same to swing the segment, and a cylinder carried by the rear section for each piston and within which each piston is reciprocable.

JAMES B. JARMIN.
THOMAS P. MOORE.